US012792060B2

(12) United States Patent
Zhong et al.

(10) Patent No.: US 12,792,060 B2
(45) Date of Patent: Nov. 10, 2026

(54) CONTROL METHOD AND DEVICE

(71) Applicant: SZ DJI TECHNOLOGY CO., LTD., Shenzhen (CN)

(72) Inventors: Junxun Zhong, Shenzhen (CN); Chenxi Peng, Shenzhen (CN); Kai Wang, Shenzhen (CN); Weihang Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/891,941

(22) Filed: Sep. 20, 2024

(65) Prior Publication Data

US 2025/0013248 A1 Jan. 9, 2025

Related U.S. Application Data

(63) Continuation of application No. PCT/CN2022/082027, filed on Mar. 21, 2022.

(51) Int. Cl.

| | |
|---|---|
| ***G05D 1/654*** | (2024.01) |
| ***G05D 1/243*** | (2024.01) |
| ***G05D 1/248*** | (2024.01) |
| ***G05D 1/606*** | (2024.01) |
| ***G05D 1/617*** | (2024.01) |
| ***G05D 1/622*** | (2024.01) |
| ***G05D 109/20*** | (2024.01) |
| ***G05D 111/10*** | (2024.01) |
| ***G05D 111/67*** | (2024.01) |

(52) U.S. Cl.

CPC ............. *G05D 1/654* (2024.01); *G05D 1/606* (2024.01); *G05D 1/621* (2024.01); *G05D 1/622* (2024.01); *G05D 2109/20* (2024.01); *G05D 2111/67* (2024.01)

(58) Field of Classification Search

CPC ........ G05D 1/654; G05D 1/606; G05D 1/621; G05D 1/622; G05D 2109/20; G05D 2111/67; G05D 2111/10; G05D 1/243; G05D 1/248; G05D 1/6545

See application file for complete search history.

(56) References Cited

U.S. PATENT DOCUMENTS

2017/0129618 A1* 5/2017 Shi ........................ B64D 31/00

FOREIGN PATENT DOCUMENTS

CN 104777499 A 7/2015
CN 106767853 A 5/2017

(Continued)

OTHER PUBLICATIONS

International Search Report for PCT/CN2022/082027 issued on Aug. 22, 2022.

(Continued)

*Primary Examiner* — Harry Y Oh

(57) ABSTRACT

A control method is provided, including: obtaining a current altitude of an aircraft, and determining a preset horizontal deviation threshold corresponding to the current altitude; obtaining a current horizontal deviation, wherein the current horizontal deviation is a horizontal deviation between a landing position and a current position of the aircraft; and determining a landing strategy of the aircraft based at least in part on a comparison between the current horizontal deviation and the preset horizontal deviation threshold.

16 Claims, 3 Drawing Sheets

100

(56) References Cited

FOREIGN PATENT DOCUMENTS

| | | | |
|---|---|---|---|
| CN | 107340781 | A | 11/2017 |
| CN | 109992006 | A | 7/2019 |
| CN | 110059701 | A | 7/2019 |
| CN | 110703790 | A | 1/2020 |
| CN | 110825101 | A | 2/2020 |
| CN | 111176323 | A1 | 5/2020 |
| CN | 111897366 | A | 11/2020 |
| CN | 112198902 | A | 1/2021 |
| CN | 112256063 | A | 1/2021 |
| CN | 112789571 | A | 5/2021 |
| CN | 112822626 | A | 5/2021 |
| CN | 113359788 | A | 9/2021 |
| JP | 2019051741 | A | 4/2019 |
| KR | 20190000439 | A | 1/2019 |
| KR | 102199680 | B1 | 1/2021 |
| KR | 102340192 | B1 | 12/2021 |
| WO | 2020121530 | A1 | 6/2020 |

OTHER PUBLICATIONS

Zeng, Anmin; Yang, Yuanxi; Jing, Yifan; Ming, Feng, Systematic Bias Compensation Model of Inter-system Bias and Its Performance Analysis for BDS/GPS Fusion Positioning, Geomatics and Information Science of Wuhan University, vol. 42, No. 10, Oct. 5, 2017, [1423]-[1430].

* cited by examiner

CONTROL METHOD AND DEVICE

RELATED APPLICATIONS

This application is a continuation application of PCT application No. PCT/CN2022/082027, filed on Mar. 21, 2022, and the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technical field of aircraft control, and in particular to a control method and device.

BACKGROUND

In recent years, with the development of technology, aircrafts (for example, unmanned aviation vehicles (UAVs), etc.) have taken on tasks such as aerial photography, inspection, and surveying, etc. The unmanned operation of UAVs has also become an important area of application, greatly enhancing safety, reducing costs, and improving productivity. In UAV application scenarios, there are extremely high requirements for the stability of the entire UAV system, with a key aspect being the success rate of UAV landings. Accurate landing control strategies for UAVs can improve landing precision. In unmanned UAV application scenarios, improved landing precision can directly increase the success rate of landings, playing an important role in enhancing the stability of the entire unmanned system.

In the existing technology, the precision of the UAV's landing position is improved by some means, and then during the descent process, the UAV is controlled to fly towards the landing position to improve control precision and reduce landing deviation. It has been found that in this disclosure, in response to that the UAV's control capability decreases or there are environmental limitations such as wind, there is currently no good method to handle the issue of poor landing precision, often leading to landing failures.

SUMMARY

Embodiments of the present disclosure a control method and device for UAV landing, as well as a UAV, to solve one or more problems in the existing technology.

In a first aspect, the present disclosure provides a control method, including: obtaining a current altitude of an aircraft, and determining a preset horizontal deviation threshold corresponding to the current altitude; obtaining a current horizontal deviation, where the current horizontal deviation is a horizontal deviation between a landing position and a current position of the aircraft; and determining a landing strategy of the aircraft based at least in part on a comparison between the current horizontal deviation and the preset horizontal deviation threshold.

In a second aspect, the present disclosure provides a control method, including: in a process of an aircraft taking off from a take-off position and ascending to a preset altitude, recording feature information of an environment surrounding the aircraft at a preset interval; and when the aircraft returns to a landing position, identifying the landing position based at least in part on the feature information, and controlling the aircraft to land at the landing position, where the take-off position is the same as the landing position.

In a third aspect, the present disclosure provides a control device, including: at least one storage medium storing at least one set of instructions; and at least one processor in communication with the at least one storage medium, where during operation, the at least one processor executes the at least one set of instructions to cause the device to at least: obtain a current altitude of an aircraft, and determining a preset horizontal deviation threshold corresponding to the current altitude, obtain a current horizontal deviation, where the current horizontal deviation is a horizontal deviation between a landing position and a current position of the aircraft, and determine a landing strategy of the aircraft based at least in part on a comparison between the current horizontal deviation and the preset horizontal deviation threshold.

BRIEF DESCRIPTION OF THE DRAWINGS

In order to clearly illustrate the technical solutions of the embodiments of the present disclosure, the following will briefly introduce the drawings for the description of some exemplary embodiments. Apparently, the accompanying drawings in the following description are some exemplary embodiments of the present disclosure. For a person of ordinary skill in the art, other drawings may also be obtained based on these drawings without creative efforts.

DETAILED DESCRIPTION

Figure 1:
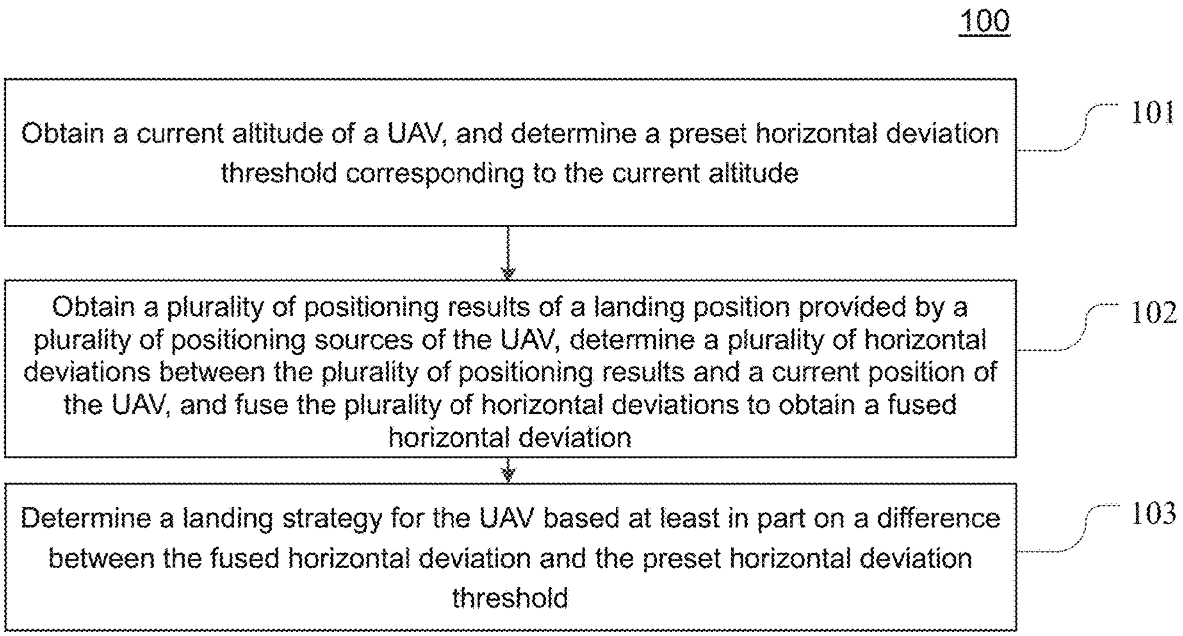
FIG. 1 is a flow chart of a process 100 for controlling UAV landing according to some exemplary embodiments of the present disclosure.

To make the objectives, technical solutions, and advantages of the embodiments of this disclosure clear, the technical solutions in the embodiments of this disclosure will be described in conjunction with the accompanying drawings. It is evident that the described embodiments are part of the embodiments of this disclosure and not all of them. Based on these exemplary embodiments of this disclosure, all other embodiments obtained by a person of ordinary skill in the art without making inventive work fall within the scope of protection of this disclosure.

It should be noted that, where there is no conflict, embodiments and features of the embodiments in this disclosure can be combined with each other.

This disclosure may be described in the general context of computer-executable instructions, such as program modules. Generally, program modules include routines, programs, objects, elements, data structures, etc., that perform particular tasks or implement particular abstract data types. This disclosure can also be practiced in distributed computing environments, where tasks are performed by remote processing devices connected by a communication network. In distributed computing environments, program modules may be located in local and remote computer storage media, including storage devices.

In this disclosure, "module," "device," "system," etc., refer to related entities applied to computers, such as hardware, a combination of hardware and software, software, or software in execution. Specifically, for example, an element can be, but is not limited to, a process running on a processor, a processor, an object, an executable element, an executing thread, a program, and/or a computer. Additionally, an application or script running on a server, and the server itself, can also be elements. One or more elements may be in executing processes and/or threads, and elements can be localized on one computer and/or distributed across two or more computers, and can be run by various computer-readable media. Elements can also communicate via local and/or remote processes based on signals with one or more data packets, such as data signals interacting with a local system, an element in a distributed system, and/or other systems through the internet.

Finally, it should be noted that relational terms such as "first" and "second" are only used to distinguish one entity or operation from another and do not necessarily require or imply any actual relationship or order between these entities or operations. Moreover, the terms "comprising" and "including" not only include the listed elements but also other elements not explicitly listed, or elements inherent to such a process, method, article, or device. Without further limitations, elements defined by the phrase "comprising . . . " do not exclude the presence of additional identical elements in the process, method, article, or device that includes the stated elements.

It should also be noted that, where there is no conflict, the following embodiments and features in the embodiments can be combined with each other.

The embodiments described in the present disclosure use one or more unmanned aerial vehicles as examples, but do not limit the scope of the present disclosure. The present disclosure is also applicable to any other suitable vehicles, such as movable platforms and aircraft. In some exemplary embodiments of this disclosure, the UAV can be a multirotor UAV, a fixed-wing UAV, or other types of UAVs, such as a helicopter UAV.

It has been found that the landing error of the UAV may come from two aspects: the positioning bias of the positioning source and the control error of the UAV. During the UAV's landing process, it is often possible to obtain one or more positioning sources, and the UAV can often employ a method/process to convert the outputs of these positioning sources into horizontal deviations of the UAV. During this conversion, additional errors may be introduced due to the design of the conversion method/process. Categorizing these errors and designing different processing strategies for the sources of these errors is a feasible approach. A design strategy based on the horizontal deviation can simultaneously address various sources of these errors.

Referring to FIG. 1, which shows a flowchart of a UAV landing control process 100 according to some exemplary embodiments of this disclosure. The entity responsible for executing the UAV landing control method/process in this disclosure can be the UAV itself or a control device installed on the UAV and in communication with the UAV. Some or all aspects of the process (or any other processes described herein, or variations and/or combinations thereof) may be performed by one or more processors onboard a movable object, a remote control device, any other system or device or a combination thereof. Some or all aspects of the process (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

As shown in FIG. 1, in step 101: obtain a current altitude of a UAV, and determine a preset horizontal deviation threshold corresponding to the current altitude.

In step 102, obtain a plurality of positioning results of a landing position provided by a plurality of positioning sources of the UAV, determine a plurality of horizontal deviations between the plurality of positioning results and a current position of the UAV, and fuse the plurality of horizontal deviations to obtain a fused horizontal deviation.

In step 103, determine a landing strategy for the UAV based at least in part on a comparison between the fused horizontal deviation and the preset horizontal deviation threshold.

In some exemplary embodiments, for step 101, first, the current altitude of the UAV is obtained, and then a preset horizontal deviation threshold corresponding to this current altitude is determined. Different altitudes can correspond to different preset horizontal deviation thresholds. For example, different horizontal deviation thresholds can be set based on the acceptable average values and variance at different altitudes. A larger threshold can be set at a higher altitude and gradually reduced as the altitude decreases, with the threshold being set to a value that meets landing precision requirements as the UAV approaches the ground. This approach can accommodate the characteristic that some positioning sources may have poorer accuracy at higher altitudes. This disclosure does not impose specific limitations in this regard.

Subsequently, for step 102, multiple positioning sources of the UAV can provide multiple positioning results for the landing position. Based on each positioning result, a horizontal deviation between the landing position and the UAV's current position can be obtained. This results in multiple horizontal deviations corresponding to the multiple positioning results. By fusing these multiple horizontal deviations, a fused horizontal deviation can be obtained. The fusion method/process may include averaging or prioritizing based on the priority of each positioning source, etc., and this disclosure does not limit such methods.

Finally, for step 103, at least the landing strategy of the UAV can be determined based at least in part on the comparison between the fused horizontal deviation and a preset horizontal deviation threshold. For example, if a difference between the fused horizontal deviation and a preset horizontal deviation threshold is large, the strategy may prioritize correcting the horizontal deviation. If the difference is small, the strategy may involve continuing to lower the UAV's altitude. In addition to determining the landing strategy based on this comparison, other factors can also be considered, such as the UAV's current surrounding environment, including obstacles, wind speed, and lighting conditions, etc. This disclosure does not impose any limitations on such factors.

This method/process involves deciding the UAV's landing strategy by fusing the horizontal deviations of multiple positioning results from multiple positioning sources, which is then compared with a preset horizontal deviation threshold corresponding to the current altitude. This comparison helps determine a landing strategy that is better suited to the UAV's current altitude; thereby improving control accuracy during the UAV's landing.

In some exemplary embodiments, the determining of the UAV's landing strategy based on the comparison between the fused horizontal deviation and the preset horizontal deviation threshold includes: determining the UAV's landing strategy based on this comparison and the current landing environment. In some exemplary embodiments, determining the UAV's landing strategy based on this comparison and the current landing environment includes: determining the difference between the fused horizontal deviation and the preset horizontal deviation threshold, and obtaining the UAV's current landing environment; and then determining the UAV's landing strategy based on this difference and the current landing environment. By comparing the fused horizontal deviation and the preset horizontal deviation threshold and considering the UAV's current landing environment, a more effective landing strategy for the UAV can be determined.

Moreover, the current landing environment of the UAV includes whether the surrounding environment is clear and the current wind speed. Whether the surrounding environment is clear can be determined by checking for obstacles within a certain range around the UAV. The wind speed can be detected using sensors on the UAV, external sensors, or by obtaining weather information from a cloud server. This disclosure does not impose any limitations on these methods.

In some exemplary embodiments, the determining of the UAV's landing strategy based on the comparison between the fused horizontal deviation and the preset horizontal deviation threshold includes: if the fused horizontal deviation is less than the preset horizontal deviation threshold, the surrounding environment is clear, and the current wind speed is less than a preset wind speed threshold, then the UAV is controlled to continue lowering its altitude. If the fused horizontal deviation is less than the preset horizontal deviation threshold and the surrounding environment is clear with low wind speed, it indicates that the UAV is currently aligned with the landing position and can be stably controlled, thus allowing the UAV to continue lowering its altitude.

In some exemplary embodiments, the landing strategy of the UAV is determined based at least in part on the comparison between the fused horizontal deviation and the preset horizontal deviation threshold, including: if the fused horizontal deviation is greater than or equal to the preset horizontal deviation threshold, the surrounding environment is clear, and the current wind speed is less than the preset wind speed threshold; controlling the UAV to stop descending in altitude and correct the horizontal distance between the UAV and the landing position based on the fused horizontal deviation until the fused horizontal deviation is less than the preset horizontal deviation threshold. If the fused horizontal deviation is greater than or equal to the preset horizontal deviation threshold and the surrounding environment is clear with low wind speed, it indicates that the UAV is not currently aligned with the landing position but can be stably controlled. In this case, the altitude descent can be stopped, and priority can be given to correcting the horizontal deviation until the UAV is determined to be aligned with the landing position.

In some exemplary embodiments, the landing strategy of the UAV is determined based at least in part on the comparison between the fused horizontal deviation and the preset horizontal deviation threshold, including: if the fused horizontal deviation is greater than or equal to the preset horizontal deviation threshold and there is an obstacle in the direction of the fused horizontal deviation; controlling the UAV to descend around the obstacle in the direction toward the landing position until the fused horizontal deviation is less than the preset horizontal deviation threshold. For situations where there is an obstacle in the direction of the horizontal deviation and it is necessary to correct the horizontal deviation first, while maintaining the descent, the UAV can attempt to bypass the obstacle from the side. By descending around the obstacle in the direction toward the landing position, the UAV can approach the landing position while descending.

Moreover, the controlling of the UAV to descend around the obstacle in the direction toward the landing position until the fused horizontal deviation is less than the preset horizontal deviation threshold includes: during the UAV's descent around the obstacle, if after completing one circle around the obstacle, the fused horizontal deviation remains greater than the preset horizontal deviation threshold and the UAV's current power is greater than a preset power threshold, continuing to control the UAV to descend around the obstacle until the fused horizontal deviation is less than the preset horizontal deviation threshold. If, after circling once, the UAV's position cannot be corrected to be above the landing position, it is necessary to further consider whether the UAV's current power is sufficient. If the power is sufficient, the UAV can continue to circle and descend, thereby correcting the horizontal deviation while descending. The preset horizontal deviation threshold can be calibrated in advance.

Furthermore, the controlling of the UAV to descend around the obstacle in the direction toward the landing position until the fused horizontal deviation is less than the preset horizontal deviation threshold includes: during the UAV's descent around the obstacle, if after completing one circle around the obstacle, the fused horizontal deviation remains greater than the preset horizontal deviation threshold and the UAV's current power is less than or equal to the preset power threshold, controlling the UAV to descend vertically at the position where the difference between the fused horizontal deviation and the preset horizontal deviation threshold is the smallest. Thus, if after circling once, the UAV's position cannot be corrected to be above the landing position and considering the power is insufficient, a position with a smaller deviation difference can be chosen for descent. This position can be the one with the smallest deviation difference found after circling, or a nearby position with a small deviation difference. This disclosure does not limit this.

In some exemplary embodiments, if there is a positional deviation between the UAV and the dock/landing position in the horizontal direction, the UAV can move horizontally to adjust the horizontal deviation with the landing position. If there is an obstacle in the direction of adjusting the horizontal deviation, the UAV is controlled to descend around the obstacle in the direction toward the landing position until the horizontal deviation is less than the preset horizontal deviation threshold. For situations where there is an obstacle in the direction of the horizontal deviation and it is necessary to correct the horizontal deviation first, while maintaining descent, the UAV can attempt to bypass the obstacle from the side. By descending around the obstacle toward the landing position, the UAV can approach the landing position while descending.

Moreover, the controlling of the UAV to descend around the obstacle in the direction toward the landing position until the horizontal deviation is less than the preset horizontal deviation threshold includes: during the UAV's descent around the obstacle, if after completing one circle around the obstacle, the horizontal deviation remains greater than the preset horizontal deviation threshold and the UAV's current power is greater than the preset power threshold, continuing to control the UAV to descend around the obstacle until the horizontal deviation is less than the preset horizontal deviation threshold. If after circling once, the UAV's position cannot be corrected to be above the landing position, it is necessary to further consider whether the UAV's current power is sufficient. If the power is sufficient, the UAV can continue to circle and descend, thereby correcting the horizontal deviation while descending.

In some exemplary embodiments, if there is an obstacle directly below the UAV during its descent, the altitude difference between an altitude of the UAV relative to the obstacle and an altitude of the UAV relative to the landing position is determined. If the altitude difference is less than a preset altitude difference threshold, the UAV is controlled to land on the obstacle. If the altitude difference is greater than or equal to the preset altitude difference threshold, the UAV is controlled to fly in the direction for bypassing the obstacle. If there is an obstacle below the UAV during its descent, the UAV may recognize the landing position or the ground as an obstacle. Therefore, the altitude difference between an altitude of the UAV relative to the obstacle and an altitude of the UAV relative to the landing position can be determined. If this altitude difference is within the preset altitude difference threshold, such as within the accuracy range of the current positioning source or within an acceptable altitude difference range, it can be determined that the obstacle is the landing position, and the UAV can be controlled to land. Conversely, if the altitude difference is greater than or equal to the preset altitude difference threshold, the UAV needs to be controlled to bypass the obstacle.

In some exemplary embodiments, the current landing environment of the UAV includes wind speed. The landing strategy of the UAV is determined based at least in part on the comparison between the fused horizontal deviation and the preset horizontal deviation threshold, as well as the current landing environment of the UAV, including: if the wind speed is greater than or equal to the preset wind speed threshold, controlling the UAV to reduce its descent speed while continuing to descend and ensuring the UAV moves away from obstacles during descent. Thus, in response to that the wind speed is high, reducing the descent speed can help maintain control over the UAV, and continuous descent prevents the UAV from hovering in high-wind areas. Additionally, moving away from obstacles during descent effectively prevents uncontrolled collisions with obstacles. Although this approach may increase the horizontal deviation between the UAV and the landing position, it better ensures the safety of the UAV.

In some exemplary embodiments, the current landing environment of the UAV includes lighting conditions. The landing strategy of the UAV is determined based at least in part on the comparison between the fused horizontal deviation and the preset horizontal deviation threshold, as well as the current landing environment of the UAV, including: if the lighting conditions are poor and there is a controllable lighting device at the landing position, controlling the UAV to remotely activate the controllable lighting device. Since the UAV might perform tasks at night or under poor lighting conditions, if there is a controllable lighting device at the landing position, the UAV can remotely activate this lighting device, making it easier for the UAV to locate the landing position.

Moreover, the UAV can be controlled to search for a bright area(s) below and approach a bright area closest to the UAV of the landing positions provided by the multiple positioning sources. When the UAV descends to a landing position confirmation altitude, it determines whether the landing position below the UAV is accurate. If the landing position below the UAV is accurate, control the UAV to land. If the landing position below the UAV is not accurate, control the UAV to ascend and search for the next closest bright area to the landing position. The bright area can significantly narrow the search range for the UAV's landing position. Therefore, when it is known that the lighting device at the landing position is turned on, either by UAV remote control or by the landing location/dock, the UAV can first approach the bright area closest to the positioning result provided by multiple positioning sources. After reaching the altitude to confirm the landing position, it then determines whether the landing position is accurate. If not, it ascends to the next closest bright area to the positioning result until a landing position is found. Specifically, the UAV can search for bright areas below using its downward-facing camera, and then approach the closest one to the landing position provided by the positioning sources. If not accurate, it will approach the next closest bright area.

In some exemplary embodiments, the obtaining of the multiple horizontal deviations between the multiple landing position results provided by the UAV's multiple positioning sources and the UAV's current position includes: obtaining multiple landing position results provided by the UAV's multiple positioning sources; determining whether there is a significant discrepancy between the positioning results provided by a minority of the positioning sources and the positioning results provided by a majority of the positioning sources; if there is no significant discrepancy between the positioning results provided by the minority and the majority of the positioning sources, determining multiple horizontal deviations based on the positioning results provided by the multiple positioning sources. If there is a significant discrepancy between the positioning results provided by the minority of the positioning sources and the positioning results provided by the majority of the positioning sources, it indicates that the minority positioning sources may have failed. In such a case, the positioning results provided by the majority of the positioning sources are given priority. The fused horizontal deviation is then determined based on the positioning results provided by the majority of the positioning sources. This fused horizontal deviation can be based at least in part on either an average value fusion or a priority-based fusion; this disclosure does not limit the method of fusion.

Moreover, the method further includes: if there is a significant discrepancy between the positioning results provided by the minority of the positioning sources and the positioning results provided by the majority of the positioning sources, determining the multiple horizontal deviations based at least in part on the positioning results provided by the majority of the positioning sources, and determining the UAV's landing strategy based at least in part on the horizontal deviations; or if there is a significant discrepancy between the positioning results provided by a minority of the positioning sources and the positioning results provided by the majority of the positioning sources, determining the UAV's landing strategy based at least in part on the positioning result provided by the highest-priority positioning source among the majority of the positioning sources. This way, the landing strategy can be determined based on the multiple horizontal deviations obtained from the majority of the positioning sources or based on the positioning result provided by the highest-priority positioning source. Thus, there can be corresponding landing strategies in case some positioning sources fail or are inaccurate. Furthermore, the priority level can be determined based on positioning accuracy or current altitude to prevent certain high-accuracy positioning sources from failing at certain altitudes, which will not be elaborated herein.

Furthermore, the method further includes: if it is confirmed via the UAV that the positioning result provided by one or more positioning sources is not the landing position, then those one or more positioning sources are blocked. If it is confirmed that the location reached according to the positioning results of one or more positioning sources is not the landing position, it indicates that the positioning results might be inaccurate. Therefore, those one or more positioning sources can be blocked to prevent receiving inaccurate positioning results continuously.

In some exemplary embodiments, since the accuracy of RTK positioning sources and visual re-localization positioning sources may not meet the landing requirements after the UAV descends to a low altitude, it is necessary to calculate the UAV's attitude based at least in part on the specific visual features of the landing location/dock to achieve a higher landing precision. Therefore, the multiple positioning sources provided in this disclosure also include a visual pattern positioning source. The center of the visual pattern positioning source includes a non-centrosymmetric first geometric shape, used to distinguish the orientation of the visual pattern positioning source. Moreover, the periphery of the visual pattern positioning source includes at least two second geometric shapes, which can be symmetric or asymmetric geometric shapes; this disclosure does not limit this. If the periphery of the visual pattern positioning source includes at least two asymmetric second geometric shapes, it can further improve the UAV's recognition accuracy of the visual pattern positioning source. The second geometric shapes can be geometric shapes with multiple corners, thereby providing a sufficient number of key points for auxiliary recognition. Furthermore, both the first geometric shape and the second geometric shape are distinguishable from the background color of the visual pattern. This can improve the accuracy of model recognition, especially in relatively dark environments.

In some exemplary embodiments, the recognition steps of the visual pattern positioning source include: identifying the two-dimensional coordinates of all corner points of all geometric shapes in the visual pattern positioning source; determining the three-dimensional coordinates of all corner points based on the known positional relationship of these corner points in three-dimensional space; matching the two-dimensional coordinates of all corner points with the three-dimensional coordinates to obtain a corner point matching relationship; iteratively optimizing to obtain a camera attitude based at least in part on given camera intrinsic parameters and the corner point matching relationship. The position of the land location is known in advance, with the absolute position of the center point pre-stored, and the relative positions of the corner points in the geometric pattern to the center point are known. Specifically, for example, the UAV can start recognizing the visual pattern positioning source when it descends to around 3 meters.

Figure 2:
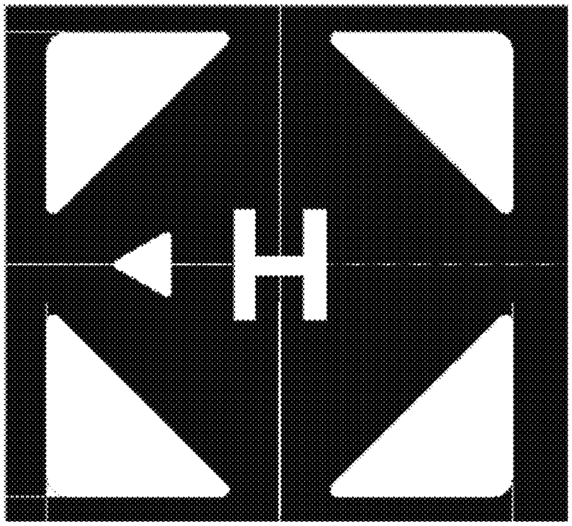
FIG. 2 is an example of a visual sample positioning source according to some exemplary embodiments of the present disclosure.

Referring to FIG. 2, it shows a design example of a visual pattern positioning source. In this example, the arrow next to the "H" indicates the orientation of the visual pattern. The background color is black, and the four non-centrosymmetric triangles provide 12 corner points, which can better assist in recognition.

In some exemplary embodiments, the multiple positioning sources include any one or more of the following: RTK (real-time kinematic) positioning source, visual pattern positioning source, visual relocalization positioning source, GPS (global positioning system) positioning source, GNSS (global navigation satellite system) positioning source, or UWB (ultra-wide band) positioning source. This allows for better control of the UAV's precise landing through the positioning results of multiple positioning sources.

The three-dimensional absolute coordinates in space are crucial for the precise landing of UAVs. A UAV can rely on centimeter-level precision three-dimensional absolute coordinates provided by high-precision sensors like RTK to achieve precise landing directly. Alternatively, it can use meter-level precision three-dimensional absolute coordinates provided by sensors such as GNSS. Upon reaching the vicinity of the landing position, high-precision local coordinates can be obtained by relative positioning methods such as markers, UWB, or Bluetooth to achieve precise landing. In practical applications at unattended base stations, when the UAV approaches the base station for landing, absolute positioning sensors might fail under complex conditions such as external signal interference or spoofing. Relative positioning methods typically have a limited effective range, which can result in the UAV not being able to enter the working range of the relative positioning methods if the absolute positioning sensors fail. This affects the success rate of precise landing.

Based on the above considerations, this disclosure also provides the following exemplary embodiments to address the issue of imprecise UAV landings in one or more of the aforementioned situations.

Figure 3:
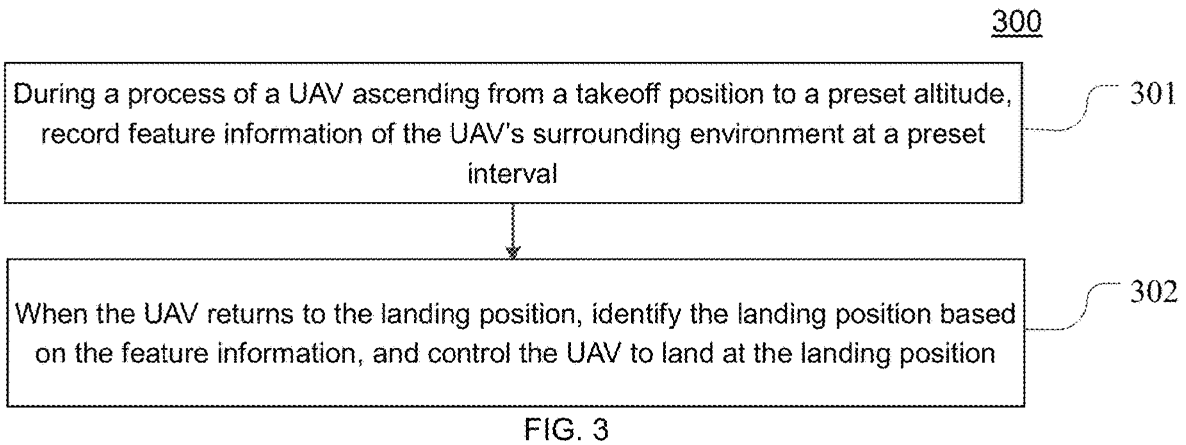
FIG. 3 is a flow chart of a process 300 for controlling UAV landing according to some exemplary embodiments of the present disclosure.

Referring to FIG. 3, it shows a flowchart of a UAV landing control process 300 provided by some exemplary embodiments of this disclosure.

As shown in FIG. 3, in step 301, during a process of the UAV ascending from a takeoff position to a preset altitude, record feature information of the UAV's surrounding environment at a preset interval.

In step 302, when the UAV returns to the landing position, identify the landing position based on the feature information, and control the UAV to land at the landing position, where the takeoff position and the landing position are the same.

In some exemplary embodiments, for step 301, during the process of the UAV ascending from the takeoff position, feature information of the environment surrounding the UAV can be recorded at a preset interval until reaching a preset altitude. For example, images of the area directly below the UAV can be captured using a camera; this disclosure does not impose any restrictions here. The preset interval can be a preset time interval, such as every few seconds, or a distance interval, such as every 10 meters. The preset altitude can be, for example, 100 meters; this disclosure does not impose any restrictions here.

Next, for step 302, during the process of returning and descending to the landing position, the landing position can be identified based on the recorded feature information, and the UAV can be controlled to land at the identified landing position, where the takeoff position and the landing position are the same, or when the distance between the takeoff position and the landing position is sufficiently small, they can be considered the same. Thus, the method/process in this disclosure provides a new landing approach that relies less on the positioning information of the positioning source by using the feature information recorded at takeoff to assist in identifying the landing position during a landing process.

In some exemplary embodiments, when the UAV returns and descends to the landing position, the identifying of the landing position based at least in part on the feature information and controlling the UAV to land at the landing position includes: when the UAV returns and descends to the landing position, if the high-precision absolute positioning sensor fails, identifying the landing position based at least in part on the feature information, and controlling the UAV to land at the landing position; or, when the UAV returns and descends to the landing position, if the high-precision absolute positioning sensor fails and the relative positioning method is out of range, identifying the landing position based at least in part on the feature information, and controlling the UAV to land at the landing position. Thus, in response to that the high-precision absolute positioning sensor fails or both the high-precision absolute positioning sensor fails and the relative positioning method is out of range, the landing position can be identified based art least in part on the pre-recorded feature information. This method can be used throughout the entire landing process or only when other positioning methods fail or are out of range, and then the high-precision absolute positioning sensor or the relative positioning method can be re-enabled once they are back in range. This disclosure does not limit the use of such methods.

In some exemplary embodiments, the failure of the high-precision absolute positioning sensor includes: the signal strength transmitted by the high-precision absolute positioning sensor is lower than a preset threshold or the signal transmitted by the high-precision absolute positioning sensor is unreliable. The condition where the signal strength transmitted by the high-precision absolute positioning sensor is lower than the preset threshold includes signal loss. Furthermore, the high-precision positioning sensor includes: GNSS (global navigation satellite system) or RTK (real-time kinematic) sensors; the relative positioning method includes short-range relative positioning methods using positioning markers, UWB, or Bluetooth, etc.

In some exemplary embodiments, the above method may further include: when the UAV returns and descends to the landing position, if the high-precision absolute positioning sensor is effective, identifying the landing position based at least in part on a positioning result provided by the high-precision absolute positioning sensor, and controlling the UAV to land at the landing position. Thus, by combining the identification of the landing position based on recorded feature information in response to that the positioning sensor is ineffective and the identification of the landing position by the positioning results in response to that the positioning sensor is effective, it is possible to control the UAV to land accurately whether or not there are positioning results, ensuring that there is a corresponding landing strategy in place.

In some exemplary embodiments, during the process of the UAV ascending from the take-off position to a preset altitude, the recording of the feature information of the surrounding environment of the UAV at a preset interval includes: during the process of the UAV ascending from the take-off position to the preset altitude, recording multi-layer feature information of the surrounding environment corresponding to the altitude of the UAV at the preset interval the identifying of the landing position based at least in part on the feature information includes: performing a depth-first search based at least in part on information matching multiple UAV altitudes corresponding to the UAV to find the landing position of the UAV. By matching the recorded feature information with the current information obtained at the altitude matching the feature information, and then performing a depth-first search, the landing position of the UAV can be found more quickly. In a specific example, based at least in part on pre-recorded multi-layer feature information, the UAV can divide the plane corresponding to the altitude of each layer of feature information into equally sized search areas. For each search area, the UAV may calculate the degree of matching with the pre-recorded information. Combining the matching degree and position of each search area, the UAV can plan a search path, from high to low matching degree, with the shortest possible flight length, so as to traverse all areas of the layer. In response to matching searches in each area, the UAV may descend to the altitude of the next layer to perform finer-grained, higher-precision area matching, path planning, and search. When the last layer is searched, if the relative positioning coordinates still cannot be obtained, it indicates a search error. The UAV can ascend, backtrack to the previous layer, and start searching the next highest matching area until the relative positioning result is finally obtained or all searches are completed.

Moreover, the identifying of the landing position of the UAV based at least in part on the multi-layer feature information through information-matching-based depth-first search at corresponding multiple UAV altitudes includes: dividing a plane corresponding to the UAV altitude of each layer of the feature information into multiple equally sized search areas, calculating the degree of matching with the corresponding feature information for each search area; when searching in any of the multiple search areas, controlling the UAV to descend to the next UAV altitude from the current UAV altitude for further division, matching, and searching of the area; planning the UAV's search path on the plane based at least in part on the matching degree and position of each search area, and starting the search and traversal from the lowest UAV altitude among the various UAV altitudes based at least in part on the search path until the landing position of the UAV is found. Thus, through the process of division, matching, and searching, the landing position of the UAV can be found more quickly.

Furthermore, the process of starting searching and traversing from the lowest UAV altitude among the various UAV altitudes based at least in part on the search path until the landing position of the UAV is found includes: when searching downwards from the highest UAV altitude in the search area with the highest matching degree, continuously descend to the next UAV altitude and calculate the area with the highest matching degree at the next UAV altitude until descending to the layer where the lowest UAV altitude is located, calculate the search area with the highest matching degree at the lowest UAV altitude and determine whether this area is the landing position, if it is not the landing position, traverse based at least in part on the search path of the plane where the lowest UAV altitude is located, if there is no landing position at the lowest UAV altitude, control the UAV to ascend to the UAV altitude above the lowest UAV altitude and, based at least in part on the search path of this altitude, divide the search area, match the area, plan the path, and search the next altitude until the landing position is found or all searches are completed. In specific searches, by first searching the area with the highest matching degree at each altitude, the landing position can be found more quickly. If the landing position is not found after searching the last layer, continue searching the area with the second highest matching degree in the next layer until the landing position is found. This method can find the UAV's landing position more quickly.

In some exemplary embodiments, the size of the preset interval is related to one or more of the range of the relative positioning method, the onboard memory size of the UAV, the landing accuracy, and the reserved endurance capacity of the UAV for landing. Among these, the range of the relative positioning method has the greatest impact, followed by the reserved endurance capacity for landing, then landing accuracy and onboard memory size. This disclosure does not limit these factors. When the range of the relative positioning method is larger, the preset interval is larger; when the range is smaller, the preset interval is smaller. When the onboard memory of the UAV is larger, the preset interval is smaller; when the onboard memory is smaller, the preset interval is larger. When higher landing accuracy is required, the preset interval is smaller; when lower landing accuracy is required, the preset interval is larger. When the reserved endurance capacity for landing is larger, the preset interval is smaller; when the reserved endurance capacity is smaller, the preset interval is larger.

Figure 4:
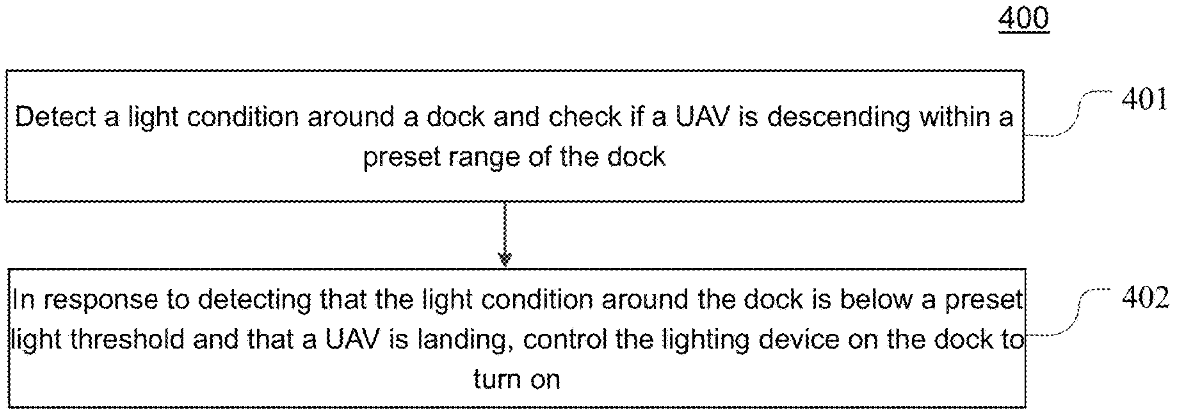
FIG. 4 is a flow chart of a process 400 for controlling UAV landing according to some exemplary embodiments of the present disclosure.

With reference to FIG. 4, it illustrates a UAV landing control process 400 for a UAV dock according to some exemplary embodiments of this disclosure.

As shown in FIG. 4, in step 401, detect a light condition around a dock and check if a UAV is descending within a preset range of the dock.

In step 402, in response to detecting that the light condition around the dock is below a preset light threshold and that a UAV is landing, control the lighting device on the dock to turn on to illuminate a visual pattern positioning source of the UAV. The visual pattern positioning source is used to assist the UAV in locating the dock.

This method of this disclosure can detect the surrounding light condition and whether there is a UAV descending nearby. In response to that the light condition is below the preset light threshold and a UAV is landing, it promptly controls the lighting device to turn on, illuminating the UAV's visual pattern positioning source to better assist the UAV in locating the dock.

In some exemplary embodiments, the method further includes: In response to the detection that the wind speed around the dock is greater than or equal to a preset wind speed threshold and that a UAV is landing, controlling the UAV to hover and wait or to land at an alternative landing position. Thus, in response to that it is detected that the wind speed around the dock is high, indicating that landing at the current position might pose a threat to the UAV's safety, the UAV can be controlled to hover and wait or to land at an alternative landing position to better ensure the safety of the UAV's landing.

In some exemplary embodiments, the center of the visual pattern positioning source includes a first non-centrosymmetric geometric shape. Furthermore, the periphery of the visual pattern positioning source includes at least two second geometric shapes. Additionally, the first and second geometric shapes are distinguishable from the background color of the visual pattern.

In some exemplary embodiments, if the UAV deviates horizontally from the dock during descent, the UAV stops descending and adjusts its horizontal position to approach the dock. If an obstacle is encountered during horizontal adjustment, the UAV moves around the obstacle and continues descending in a direction that avoids the obstacle while staying horizontally closest to the dock. Thus, when the UAV deviates from the dock during descent, it prioritizes correcting horizontal deviations and, if encountering obstacles, avoids them while continuing to descend in the direction toward the dock. This allows the UAV to approach the dock both horizontally and vertically as quickly as possible, ensuring a safe landing.

In some exemplary embodiments, if there is a horizontal position deviation between the UAV and the dock, the UAV can move horizontally to adjust the deviation. If there is an obstacle in the direction of the horizontal adjustment, the UAV is controlled to descend while circling around the obstacle in the direction toward the landing position until the horizontal deviation is less than a preset horizontal deviation threshold. For situations where there is an obstacle in the direction of horizontal deviation correction and horizontal deviation needs to be corrected first, the UAV can attempt to bypass the obstacle from the side while maintaining descent. By descending while circling around the obstacle in the direction toward the landing position, the UAV can simultaneously reduce altitude and approach the landing position.

Moreover, the controlling of the UAV to descend while circling around the obstacle in the direction toward the landing position until the horizontal deviation is less than the preset horizontal deviation threshold includes: during the UAV's descent while circling around the obstacle; if, after completing one full circle around the obstacle, the horizontal deviation remains greater than the preset horizontal deviation threshold and the UAV's current battery power is above the preset battery power threshold, continue to control the UAV to circle around the obstacle and descend until the horizontal deviation is less than the preset horizontal deviation threshold; if, after one full circle, it is found that the UAV's position cannot be corrected to be above the landing position, further consider whether the UAV's current battery power level is sufficient, if the battery level is sufficient, continue to circle and descend. This way, the UAV can simultaneously correct the horizontal deviation and descend toward the landing position.

Furthermore, the controlling of the UAV to descend while circling around the obstacle in the direction toward the landing position until the horizontal deviation is less than the preset horizontal deviation threshold includes: during the UAV's descent while circling around the obstacle, if after completing one full circle around the obstacle the horizontal deviation remains greater than the preset horizontal deviation threshold and the UAV's current battery power level is less than or equal to the preset battery power threshold, control the UAV to descend vertically to the position where the difference between the horizontal deviation and the preset horizontal deviation threshold is minimized. In this case, if after one full circle the UAV cannot be corrected to be above the landing position, and the battery power level is insufficient, find a location where the deviation is the smallest and descend toward it. This location can be the one with the smallest deviation found after circling, or it can be a nearby location with a small deviation. This disclosure does not limit the specific method for finding this location.

Figure 5:
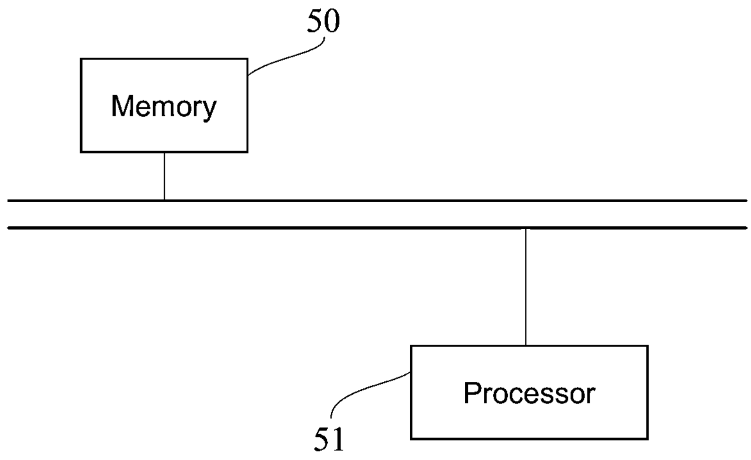
FIG. 5 is a schematic diagram of a UAV landing control device according to some exemplary embodiments of the present disclosure.

Referring to FIG. 5, it shows a UAV landing control device provided according to some exemplary embodiments of this disclosure, which includes: a storage device/memory 50, used for storing program instructions, and one or more processors 51, which execute the program instructions stored in the storage device. When these instructions are executed, the processors implement the processes described in any of the embodiments mentioned.

In some exemplary embodiments, this disclosure also provides a UAV landing control device for a UAV landing dock. The device includes: a storage device for storing program instructions; and one or more processors that call the program instructions stored in the storage device. When the program instructions are executed, the one or more processors are individually or collectively implement the method of any of the aforementioned embodiments.

In some exemplary embodiments, this disclosure also provides a UAV, which includes: a body; a driving system installed on the body for providing flight power; and the UAV landing control device as described in the aforementioned exemplary embodiments, where the UAV landing control device is communicatively connected with the driving system to control the UAV's flight.

In some exemplary embodiments, this disclosure also provides a UAV dock/landing dock, which includes: a dock/landing dock; and the UAV landing control device as described in the aforementioned exemplary embodiments, installed on the dock/landing dock.

In some exemplary embodiments, this disclosure provides a non-volatile computer-readable storage medium, which stores one or more programs that include executable instructions. These executable instructions can be read and executed by an electronic device (including but not limited to a computer, server, or network device) to perform the UAV landing control method/process of any of the aforementioned exemplary embodiments.

In some exemplary embodiments, this disclosure also provides a computer program product, which includes a computer program stored on a non-volatile computer-readable storage medium. The computer program includes program instructions that, when executed by a computer, cause the computer to perform the UAV landing control method/process of any of the aforementioned exemplary embodiments.

In some exemplary embodiments, this disclosure also provides an electronic device, which includes: at least one processor, and a memory/storage medium communicatively connected to the at least one processor. The memory stores instructions executable by the at least one processor, and when executed by the at least one processor, enable the at least one processor to perform the UAV landing control method/process of any of the aforementioned exemplary embodiments.

In some exemplary embodiments, this disclosure also provides a storage medium on which a computer program is stored. The program, when executed by a processor, implements the UAV landing control method/process of any of the aforementioned exemplary embodiments.

Figure 6:
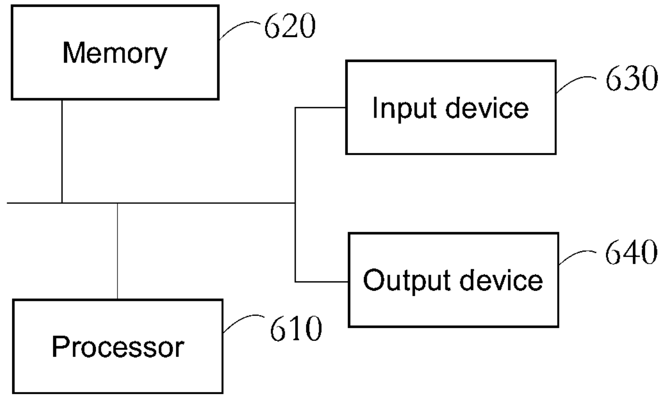
FIG. 6 is a schematic structural diagram of an electronic device according to some exemplary embodiments of the present disclosure.

FIG. 6 is a schematic diagram of the hardware structure of an electronic device for performing the UAV landing control method/process according to some exemplary embodiments of the present disclosure. As shown in FIG. 6, the device includes:

One or more processors 610 and memory 620, with FIG. 6 using a single processor 610 as an example. The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The device for executing the UAV landing control method/process may also include: an input device 630 and an output device 640.

The processor 610, memory 620, input device 630, and output device 640 can be connected via a bus or other methods, with FIG. 6 using a bus connection as an example.

The memory 620, as a non-volatile computer-readable storage medium, can be used to store non-volatile software programs, non-volatile computer-executable programs, and modules, such as the program instructions/modules corresponding to the UAV landing control method/process in this disclosure's embodiments. The processor 610 executes various functional applications and data processing of the server by running the non-volatile software programs, instructions, and modules stored in the memory 620, thereby implementing the UAV landing control method/process of the aforementioned method embodiments.

The memory 620 can include a program storage area and a data storage area. The program storage area can store an operating system and at least one application required for functionality; the data storage area can store data created according to the usage of the UAV landing control method/process. Additionally, the memory 620 can include high-speed random access memory and non-volatile memory, such as at least one disk storage device, flash memory device, or other non-volatile solid-state storage devices. In some embodiments, the memory 620 optionally includes memory that is remotely set relative to the processor 610, which can be connected to the electronic device via a network. Examples of the aforementioned network include, but are not limited to, the Internet, intranet, local area network, mobile communication network, and their combinations.

The input device 630 can receive input of digital or character information and generate signals related to user settings and function control of the image processing device. The output device 640 can include display devices such as screens.

The one or more modules are stored in the memory 620, and when executed by the one or more processors 610, perform the UAV landing control method/process of any of the method embodiments described above.

The aforementioned product can execute the methods provided by this disclosure's embodiments, possessing the corresponding functional modules and beneficial effects for executing the methods. Technical details not exhaustively described in the embodiments can be referred to in the methods provided by this disclosure's embodiments.

The electronic devices of this disclosure's embodiments exist in various forms, including but not limited to:

(1) Mobile Communication Devices: These devices are characterized by having mobile communication functions and primarily aim to provide voice and data communication. Such terminals include: smartphones, multimedia phones, feature phones, and low-end phones.

(2) Ultra-Mobile Personal Computing Devices: These devices fall within the category of personal computers, having computing and processing capabilities, and generally also feature mobile internet access. Such terminals include: PDAs (Personal Digital Assistants), MIDs (Mobile Internet Devices), and UMPCs (Ultra-Mobile PCs).

(3) Portable Entertainment Devices: These devices can display and play multimedia content. Such devices include: audio and video players, handheld gaming consoles, e-readers, smart toys, and portable in-car navigation devices.

(4) Servers: These devices provide computing services and are composed of components such as processors, hard drives, memory, and system buses. While servers share a similar architecture with general-purpose computers, they have high requirements for processing power, stability, reliability, security, scalability, and manageability to ensure high reliability of services.

(5) Other Electronic Devices with Data Interaction Functions.

The above-described device embodiments are merely illustrative. The units described as separate components may or may not be physically separate, and the components displayed as units may or may not be physical units themselves. They can be located in a single location or distributed across multiple network units. Depending on practical requirements, some or all of the modules can be selected to achieve the objectives of the embodiments of this disclosure.

From the description of the above exemplary embodiments, a person skilled in the art can understand that the various embodiments can be implemented by using software combined with a general hardware platform, or alternatively, they can be implemented entirely in hardware. Based on this understanding, the technical solutions described can essentially or contributively be embodied in the form of a software product. This computer software product can be stored on a computer-readable storage medium, such as ROM/RAM, magnetic disks, optical discs, etc., and includes several instructions to enable a computer device (which may be a personal computer, server, or network device) to perform the methods/processes described in the various embodiments or certain parts of these embodiments.

Finally, it should be noted that the above embodiments are only used to illustrate the technical solutions of this disclosure and are not meant to limit them. Although the technical solutions of this disclosure have been described in detail with reference to the aforementioned embodiments, a person skilled in the art would understand that modifications or equivalent substitutions of certain technical features can still be made. These modifications or substitutions do not depart from the principles and scope of the technical solutions of this disclosure.

What is claimed is:

1. A control method, comprising:

obtaining a current altitude of an aircraft;

setting a horizontal deviation tolerance threshold corresponding to the current altitude, wherein the horizontal deviation tolerance threshold defines a maximum allowable horizontal deviation at the current altitude;

obtaining a current horizontal deviation between a landing position and a current position of the aircraft based on real-time measurements from a plurality of positioning sources; and determining a landing strategy of the aircraft based at least in part on a comparison between the current horizontal deviation and the horizontal deviation tolerance threshold.

2. The method according to claim 1, wherein the obtaining of the current horizontal deviation includes:

obtaining the real-time measurements from the plurality of positioning sources;

determining a plurality of horizontal deviations between the landing position and the current position of the aircraft based at least in part on the real-time measurements; and obtaining the current horizontal deviation by fusing the plurality of horizontal deviations.

3. The method according to claim 1, wherein the determining of the landing strategy of the aircraft based at least in part on the comparison between the current horizontal deviation and the horizontal deviation tolerance threshold includes:

determining the landing strategy of the aircraft based at least in part on the comparison between the current horizontal deviation and the horizontal deviation tolerance threshold, and the current landing environment of the aircraft.

4. The method according to claim 3, wherein the current landing environment of the aircraft includes whether a surrounding environment is open and a current wind speed.

5. The method according to claim 4, wherein the determining of the landing strategy of the aircraft based at least in part on the comparison between the current horizontal deviation and the horizontal deviation tolerance threshold includes:

in response to that the current horizontal deviation is less than the horizontal deviation tolerance threshold, the surrounding environment is open and the current wind speed is less than a preset wind speed threshold, controlling the aircraft to continue to descend.

6. The method according to claim 4, wherein the determining of the landing strategy of the aircraft based at least in part on the comparison between the current horizontal deviation and the horizontal deviation tolerance threshold includes:

in response to that the current horizontal deviation is greater than or equal to the horizontal deviation tolerance threshold, the surrounding environment is open and the current wind speed is less than the preset wind speed threshold, controlling the aircraft to stop descending and correcting a horizontal distance between the aircraft and the landing position based at least in part on the current horizontal deviation until the current horizontal deviation is less than the horizontal deviation tolerance threshold.

7. The method according to claim 1, wherein the determining of the landing strategy of the aircraft based at least in part on the comparison between the current horizontal deviation and the horizontal deviation tolerance threshold includes:

in response to that the current horizontal deviation is greater than or equal to the horizontal deviation tolerance threshold and there is an obstacle in a direction of the current horizontal deviation, controlling the aircraft to descend around the obstacle in a direction toward the landing position until the current horizontal deviation is less than the horizontal deviation tolerance threshold.

8. The method according to claim 7, wherein the controlling of the aircraft to descend around the obstacle in the direction toward the landing position until the current horizontal deviation is less than the horizontal deviation tolerance threshold includes:

as the aircraft descending around the obstacle, in response to that the current horizontal deviation is still greater than the horizontal deviation tolerance threshold after the aircraft completes one circle of descent around the obstacle and a current power of the aircraft is greater than a preset power threshold, controlling the aircraft to continue descending around the obstacle until the current horizontal deviation is less than the horizontal deviation tolerance threshold; or as the aircraft descending around the obstacle, in response to that the current horizontal deviation is still greater than the horizontal deviation tolerance threshold after the aircraft completes one circle of descent around the obstacle and a current power of the aircraft is less than a preset power threshold, controlling the aircraft to circle the obstacle and reach a position with a smallest difference between the current horizontal deviation and the horizontal deviation tolerance threshold, and then descend vertically.

9. The method according to claim 7, wherein the controlling of the aircraft to descend around the obstacle in the direction toward the landing position until the current horizontal deviation is less than the horizontal deviation tolerance threshold includes:

as the aircraft descending around the obstacle, in response to that the current horizontal deviation is still greater than the horizontal deviation tolerance threshold after the aircraft completes one circle of descent around the obstacle and a current power of the aircraft is less than a preset power threshold, controlling the aircraft to circle the obstacle and reach a position with a smallest difference between the current horizontal deviation and the horizontal deviation tolerance threshold, and then descend vertically.

10. The method according to claim 1, further comprising:

in response to there is an obstacle directly below the aircraft during the aircraft descending, determining an altitude difference between an altitude of the aircraft relative to the obstacle and an altitude of the aircraft relative to the landing position;

in response to that the altitude difference is less than a preset altitude difference threshold, controlling the aircraft to land on the obstacle; or in response to that the altitude difference is greater than or equal to the preset the altitude difference is difference threshold, controlling the aircraft to fly in a nearest direction for bypassing the obstacle.

11. The method according to claim 3, wherein the current landing environment of the aircraft includes a wind speed; and the determining of the landing strategy of the aircraft based at least in part on the comparison between the current horizontal deviation and the horizontal deviation tolerance threshold and the current landing environment of the aircraft includes:

in response to that the wind speed is greater than or equal to a preset wind speed threshold, controlling the aircraft to descend at a reduce descent speed, and controlling the aircraft to stay away from obstacles during descending.

12. The method according to claim 3, wherein the current landing environment of the aircraft includes a lighting condition; and the determining of the landing strategy of the aircraft based at least in part on the comparison between the current horizontal deviation and the horizontal deviation tolerance threshold and the current landing environment of the aircraft includes:

in response to that the lighting condition is undesirable and there is a controllable lighting device at the landing position, controlling the aircraft to remotely turn on the controllable lighting device.

13. The method according to claim 1, further comprising:

controlling the aircraft to search for bright areas below and fly toward a bright area closest to the landing position provided by a plurality of positioning sources;

when the aircraft descends to a landing position confirmation altitude, determining whether the landing position below the aircraft is accurate;

controlling the aircraft to land upon confirming that the landing position below is accurate, or controlling the aircraft to ascend and search for a bright area that is second closest to the landing position upon confirming that the landing position below is not accurate.

14. The method according to claim 2, wherein the plurality of positioning sources include a visual pattern positioning source, and a center of the visual pattern positioning source includes a non-centrosymmetric first geometric shape.

15. The method according to claim 2, wherein the plurality of positioning sources include at least one of an RTK (real-time kinematic) positioning source, a visual pattern positioning source, a visual relocalization positioning source, a GPS (global positioning system) positioning source, a GNSS (global navigation satellite system) positioning source, or a UWB (ultra-wide band) positioning source.

16. A control device, comprising:

at least one storage medium storing at least one set of instructions; and at least one processor in communication with the at least one storage medium, wherein during operation, the at least one processor executes the at least one set of instructions to cause the device to at least:

obtain a current altitude of an aircraft;

set a horizontal deviation tolerance threshold corresponding to the current altitude, wherein the horizontal deviation tolerance threshold defines a maximum allowable horizontal deviation at the current altitude;

obtain a current horizontal deviation between a landing position and a current position of the aircraft based on real-time measurements from one or more positioning sources; and determine a landing strategy of the aircraft based at least in part on a comparison between the current horizontal deviation and the horizontal deviation tolerance threshold.

* * * * *